R. H. OSGOOD.
Inserted Saw-Teeth.
No. 222,304. Patented Dec. 2, 1879.
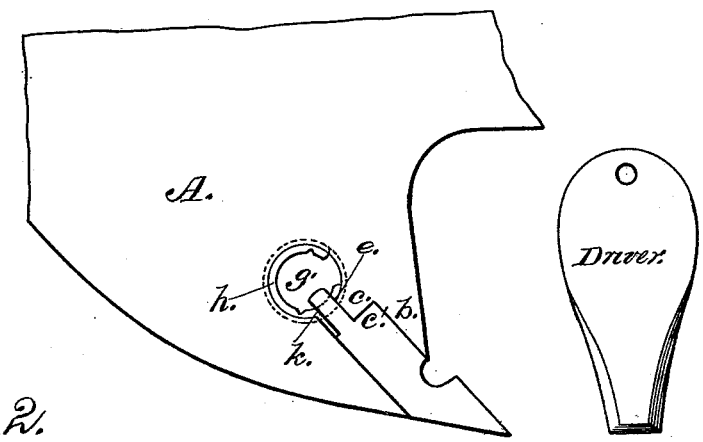
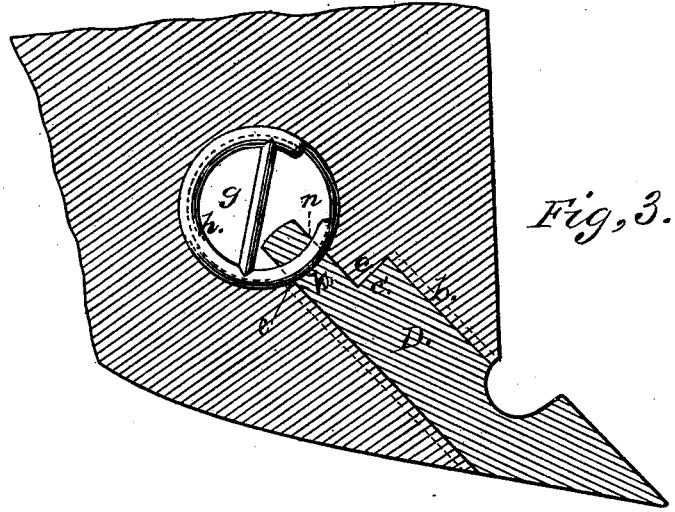

UNITED STATES PATENT OFFICE.

RICHARD H. OSGOOD, OF COLUMBUS, OHIO, ASSIGNOR TO JAMES OHLEN, OF SAME PLACE.

IMPROVEMENT IN INSERTED SAW-TEETH.

Specification forming part of Letters Patent No. 222,304, dated December 2, 1879; application filed October 18, 1879.

*To all whom it may concern:*

Be it known that I, RICHARD H. OSGOOD, of Columbus, in the county of Franklin and State of Ohio, have invented a new and valuable Improvement in Inserted Saw-Teeth; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of a saw-plate, showing my invention applied. Figs. 2 and 3 are, respectively, transverse and lengthwise sections; and Fig. 4 is a view of the driver.

This invention has relation to means for fastening inserted teeth into saw-plates; and it consists in the construction and novel arrangement of a shouldered tooth having an extension or tongue beyond the shoulder, a circular grooved opening at the head of the tooth-seat in the saw-plate, and a circularly-curved key seated in the groove of the circular opening in the plate, and designed to pass through a perforation in the extension of the tooth, and thereby secure the tooth in its seat, all as hereinafter shown and described.

In the accompanying drawings, the letter A designates the saw-plate, having the tooth-seat $b$, near the head of which is a shoulder, $c$, or shoulders, against which the shoulder $c'$ of the tooth D abuts when said tooth is inserted home.

Beyond the shoulder $c$ a narrow strait or passage, $e$, connects the tooth-seat $b$ with the circular opening $g$ at its head, forming the key-seat. This circular opening is grooved interiorly or otherwise provided with a continuous guide or way to hold the circularly-curved key or open ring, (indicated at $h$,) which is designed to be sprung into its circular seat.

Beyond its shoulder $c'$ the saw-tooth D is provided with an extension or tongue, $k$, which, when the tooth is inserted in place, passes through the passage $e$, and projects within the circular opening $g$, having at the point where it leaves the margin of said opening a perforation, $n$, in line with the groove or key-guide, and designed to receive the curved key when the latter is so turned in its seat that either of its ends passes through said perforation.

In order that the tooth may be easily inserted and removed, the space between the ends of the curved key is made wider than the breadth of the extension $k$ of the tooth, and the key is so turned that said space shall be in line with the passage $e$, through which said extension passes.

To facilitate turning the ring or key, notches may be made on opposite sides thereof for the reception of a double-edged tapered driver or wrench-key.

The shoulders $c$ $c'$ stop the tooth from being pressed into the circular key-seat, and when inserted home it is securely held by the key, the latter being turned through the perforation $n$ of the tooth-extension. This perforation is in the direction of the faces of the saw-plate, and is therefore invisible on the outside.

It will be observed that this fastening is made without screws, rivets, wedges, or other like devices tending to strain the outer section of the saw-plate. It is a simple construction, easily manipulated, and entirely devoid of any parts which might, by casual displacement, form lateral projections on the faces of the saw.

Having described this invention, what I claim, and desire to secure by Letters Patent, is—

1. An inserted saw-tooth having a shoulder, $c$, and beyond said shoulder an extension, $k$, perforated at $n$ in the direction of the faces of the saw, substantially as specified.

2. The combination, with the saw-plate having the circular key-seat $g$ and shoulder $c'$, of the inserted tooth having the shoulder $c$ and perforated extension $k$, and the curved key or open-ring fastening $h$, substantially as specified.

In testimony that I claim the above I have hereunto subscribed my name in the presence of two witnesses.

RICHARD H. OSGOOD.

Witnesses:
THOS. E. DUNCAN,
FRANK E. OHLEN.